May 3, 1932.   P. R. ALPHONSO   1,856,825
VALVE
Filed March 25, 1929
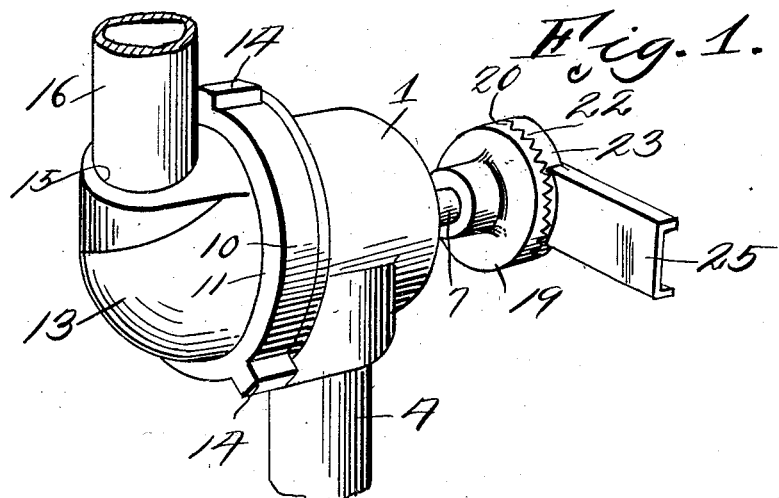
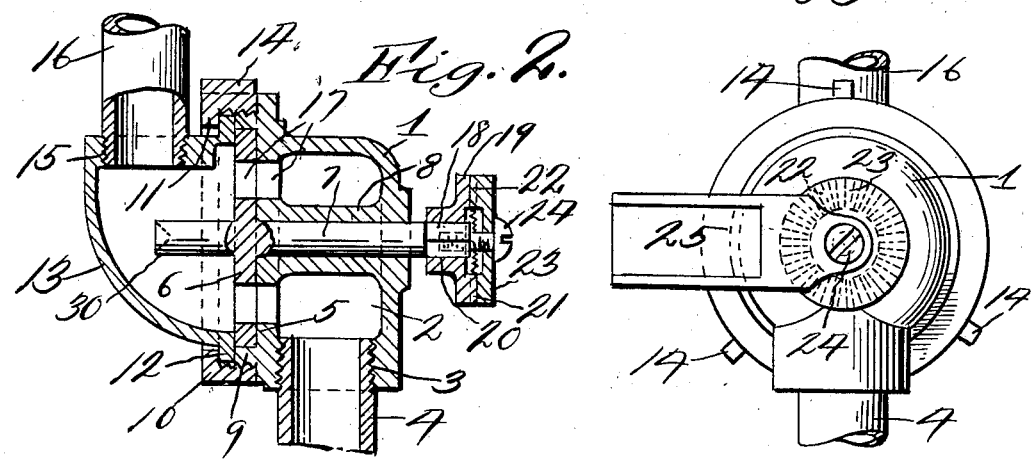
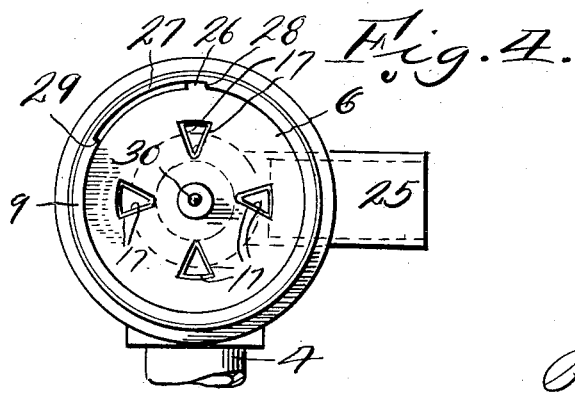
INVENTOR.
P. R. Alphonso
BY
ATTORNEY.

Patented May 3, 1932

1,856,825

UNITED STATES PATENT OFFICE

PETER R. ALPHONSO, OF SEMINOLE, OKLAHOMA

VALVE

Application filed March 25, 1929. Serial No. 349,822.

The invention relates to disc valves, and has for its object to provide a valve of this type comprising a casing having an intake pipe connected thereto and an apertured valve seat in a parallel plane to the intake pipe on which an apertured disc valve rotates and an L housing the valve, and having a union connection with the valve casing whereby said L may be rotated to various positions according to the position desired for the discharge pipe carried by the L.

A further object is to provide the disc valve with a stem extending through the bore of a member carried by the valve casing thereby obviating the use of packing for the valve stem.

A further object is to provide the L of the casing with a flange which engages one side of the disc valve and maintains the same seated, and an annular flanged ring cooperating with the flange of the L, and threaded on the valve casing for holding the disc valve in seated position.

A further object is to provide one end of the valve stem with a rectangular portion on which is disposed a disc having radial teeth on its outer face and interengaging with radial teeth of a disc carried by a handle member, and a securing screw extending through the last named disc and threaded axially into the end of the disc valve stem, said screw and interengaging teeth forming means whereby the valve handle can be adjusted to various positions according to the use of the valve as a whole.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a perspective view of the valve.

Figure 2 is a vertical longitudinal sectional view through the valve.

Figure 3 is a view in elevation of one side of the valve, showing the operating handle.

Figure 4 is a view in elevation of the opposite side of the valve, showing the elbow removed to better illustrate the disc valve, and its ports.

Referring to the drawings, the numeral 1 designates the valve casing and 2 a chamber therein. Threaded at 3 into the lower end of the casing 1 is a supply pipe 4, through which water passes to the chamber 2. One side of the valve casing 1 is provided with a valve seat 5, against which the disc valve 6 seats, and it will be noted that the disc valve 6 is in a vertical plane and provided with a valve stem 7, which is rotatably mounted in the sleeve 8 of the casing 1, and as the water does not come in contact with the valve stem, it is obvious it will not be necessary to provide packing means for the stem 7. The disc 6 is formed integral with the stem 7 and has a ground engagement with the valve seat 5, therefore it will be seen that water can not pass between the disc and seat.

Surrounding the disc valve 6 and formed integral with the valve seat 5 is an annular flange 9 on which is threaded a retaining ring 10. The retaining ring 10 is provided with an annular flange 11, which overlies the flange 12 carried by the elbow 13, which houses the disc valve 6, and it will be seen that the elbow not only maintains the disc valve 6 in engagement with its seat, but houses one side of the disc valve, thereby preventing injury or damage to the same. Annular member 10 is provided with lugs 14 which may be utilized for rotating the ring. Threaded at 15 into the elbow 13 is a discharge pipe 16 through which the water is discharged after passing through the registering ports 17 of the valve seat 5 and valve 6. It will be seen by adjusting the casing section 13 to various positions, the discharge pipe 16 may be positioned for discharging at various angles to the intake pipe 4 according to the use of the valve.

One end of the valve stem 7 is provided with a rectangular-shaped portion 18, on which is disposed a disc 19, which disc is provided with a rectangular aperture 20 in which the stem portion 18 is disposed. The outer face of the disc 19 is provided with radial teeth 21 with which the radial teeth 22 of the handle disc 23 interengage, and as the disc 23 is secured to the end of the valve stem 7 by the screw 24, it is obvious that when the handle 25 is moved upwardly, referring to Figure 4, the disc valve 6 will be rotated to closed position. By providing the interengaging teeth 21 and 22, the handle 25 may be adjusted to various positions for convenience of operation, or where a float is attached to the handle 25, as applicant does not limit himself in this respect. Extending outwardly from one side of the disc 6 is a lug 26, which lug extends into the arcuate recess 27 in the flange 9, and cooperates with the shoulders 28 and 29 formed by the recess for limiting the rotation of the disc 6 in its movement to open and closed position, and at the same time allows a relatively wide arc of movement of the handle member 25, which is particularly desirable where the device is used in connection with a float, for instance in any position where a float control valve is desired. The extension 30 carried by the disc valve 6 is preferably provided so as to form one of the supports during the turning operation when the valve is formed or finished in a lathe, however it is to be understood this may be eliminated if desired.

From the above it will be seen that a disc valve is provided with a casing having an elbow connection, which connection may be moved to various positions to form various connections according to the leads of supply and discharge pipes, thereby allowing the valve to be adapted for general use.

The invention having been set forth what is claimed as new and useful is:—

The combination with a disc valve casing, a valve seat in one side thereof, a threaded flange carried by the casing and extending outwardly from the seat and forming a disc valve receiving chamber, a disc valve rotatably mounted on said seat in the valve chamber, said disc valve being of substantially the same thickness as the flange and engaging the flange, a casing section, a flange carried by the casing section, said flange engaging the threaded flange of the valve casing and overlying the disc valve and a retaining nut threaded on the flange of the valve casing and cooperating with the casing section for forcing its flange into close engagement with the threaded flange and the disc valve.

In testimony whereof he hereunto affixes his signature.

PETER R. ALPHONSO.